(12) United States Patent
Negri et al.

(10) Patent No.: US 10,569,292 B2
(45) Date of Patent: *Feb. 25, 2020

(54) AUTOMATIC DISPENSING DEVICE FOR WALLBOARD JOINT TAPING

(71) Applicant: UNITED STATES GYPSUM COMPANY, Chicago, IL (US)

(72) Inventors: Robert H. Negri, Lake Villa, IL (US); Bernie St. James, Langley (CA); Elliot St. James, Langley (CA); Aaron St. James, Langley (CA)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,262

(22) Filed: Jan. 11, 2019

(65) Prior Publication Data

US 2019/0143362 A1 May 16, 2019

Related U.S. Application Data

(63) Continuation of application No. 14/719,851, filed on May 22, 2015, now Pat. No. 10,195,636.

(Continued)

(51) Int. Cl.
| | | |
|---|---|---|
| B32B 37/22 | (2006.01) |
| B44C 7/04 | (2006.01) |
| B05C 5/02 | (2006.01) |
| B05C 11/02 | (2006.01) |
| C09J 5/00 | (2006.01) |
| B05D 1/40 | (2006.01) |
| E04F 21/00 | (2006.01) |
| E04F 21/165 | (2006.01) |

(52) U.S. Cl.
CPC .......... *B05C 5/0245* (2013.01); *B05C 5/0254* (2013.01); *B05C 11/026* (2013.01); *B05D 1/40* (2013.01); *C09J 5/00* (2013.01); *E04F 21/00* (2013.01); *E04F 21/1657* (2013.01)

(58) Field of Classification Search
CPC . E04F 21/165; E04F 21/1652; E04F 21/1655; E04F 21/1657
See application file for complete search history.

(56) References Cited

U.S. PATENT DOCUMENTS

| | | |
|---|---|---|
| 3,260,638 A | 7/1966 | Hoveland |
| 4,086,121 A | 4/1978 | Ames |
| | (Continued) | |

FOREIGN PATENT DOCUMENTS

RU        2024710 C1    12/1994

*Primary Examiner* — Mark A Osele
(74) *Attorney, Agent, or Firm* — Greer, Burns & Crain, Ltd.; Pradip Sabu; Philip T. Petti

(57) ABSTRACT

An automatic dispensing device for wallboard joint taping is provided, including a body for holding a supply of viscous material and having a rear end and an opposite front end, a spool assembly disposed on the body and configured for supporting a spool of tape; at least one drive roller positioned at the front end and receiving an end of the spool of tape. Certain embodiments include an adhesive application assembly connected to the drive roller and mounted in operational relationship to the front end for dispensing a measured amount of adhesive upon an upper surface of the tape upon rotation of the at least one drive roll. In such embodiments, the body may be configured for holding sufficient adhesive to cover tape advanced by at least 200 rotations of the at least one drive roller.

10 Claims, 13 Drawing Sheets

Related U.S. Application Data

(60) Provisional application No. 62/016,323, filed on Jun. 24, 2014.

(56) References Cited

U.S. PATENT DOCUMENTS

| | | |
|---|---|---|
| 4,090,914 A | 5/1978 | Hauk et al. |
| 5,882,691 A | 3/1999 | Conboy |
| 6,581,805 B2 | 6/2003 | Conboy et al. |
| 6,874,557 B2 | 4/2005 | Jungklaus |
| 7,621,309 B1 | 11/2009 | Mondloch et al. |
| 7,624,782 B2 | 12/2009 | Jungklaus et al. |
| 8,517,077 B2 | 8/2013 | Payne |
| 9,359,777 B2 | 6/2016 | Jungklaus et al. |
| 2003/0138569 A1 | 7/2003 | Dillinger |
| 2004/0244916 A1 | 12/2004 | Hall et al. |
| 2005/0019532 A1 | 1/2005 | Hall et al. |
| 2007/0044923 A1 | 3/2007 | Jungklaus et al. |
| 2007/0261334 A1 | 11/2007 | Conboy |
| 2009/0094936 A1 | 4/2009 | Brown |

AUTOMATIC DISPENSING DEVICE FOR WALLBOARD JOINT TAPING

RELATED APPLICATIONS

The present application claims priority under 35 USC 120 from U.S. patent application Ser. No. 14/719,851 filed May 22, 2015, which claims priority under 35 USC 119(e) from U.S. Provisional Application Ser. No. 62/016,323 filed Jun. 24, 2014, both of which are incorporated by reference herein.

BACKGROUND

In the construction field, and particularly in interior construction, walls are commonly formed with a plurality of abutting wallboard panels or the like used to construct interior walls. A wall joint is formed at a location where two panels meet. To provide a smooth, continuous wall appearance, joint tape is applied to the wall joint. Tape is either applied to the wall joints by hand, or using devices commonly referred to as taper or taping tools.

Taper or taping tools apply a viscous filling and adhering material in the form of joint compound to the joint tape and subsequently apply the compound and tape to a wall joint. Such joint compound is also commonly referred to as mud. A variety of taper tools, also referred to as automatic dispensing devices, exist in the market place, but the taper tools generally operate in a similar manner. Initially, the taper tool is used to apply the tape and joint compound to a wall joint. The tape exits the tool from its first or forward end. After the taper tool reaches the top or bottom of the joint (depending on which direction the operator is applying the tape and compound) and completes tape application for the particular wall joint, the operator activates a cutting mechanism used to cut the tape. Typically, the cutting mechanism is disposed on and behind the forward end of the taper tool.

Accordingly, for the next application of tape to the wall surface, the tape must be advanced to the forward end of the taper tool. This can be performed by either manually grasping the tape and feeding the tape to the forward end, or by a tape advancing assembly, which is also connected to the taper tool. The tape advancing assembly is actuatable by the operator and engages the tape to advance the leading edge of the tape toward the forward end of the taper tool. Suitable exemplary taping tools are disclosed in U.S. Pat. Nos. 4,086,121; 5,882,691; 6,581,805; 6,874,557; 7,624,782 and US Patent Application Publication No. US 2007/0261334, all of which are incorporated by reference. Unfortunately, advancing the leading edge of the tape in either of these manners does not provide tape with sufficient compound applied thereto. Accordingly, the portion of the tape without compound will not stick to the wall surface and will not provide an effective seal between wall sections. Other drawbacks of conventional taping tools relate to the significant volume of joint compound required for properly adhering the tape to the wall joint, and the frequent difficulty in obtaining a good adhesive bond between the tape and the joint.

In conventional drywall construction, a typical 10,000 sq. ft. gypsum panel wall area will require over 208 pieces of gypsum panels provided by the gypsum panel manufacturer in a 4 ft×12 ft. sheet dimension. Often, the board installation process can take up to two days to complete. The gypsum panels are typically attached as full sheets and also cut to smaller and different individual dimensions less than 4 ft×12 ft size to cover the wall assembly framing, which can create over 275 individual pieces of gypsum panels attached to framing and creating numerous abutting joint seams which require joint reinforcement with joint tape affixed over the joint seams. This joint reinforcement process is commonly referred to as the joint taping operation.

A conventional taping operation is typically staffed using a 3-person crew per mechanical taping tool employed, where one crew member operates the mechanical taping tool by applying joint tapes coated in joint compound over the flat seams where panels are installed and abut edge to edge along a flat plane and angle seams where panels are installed and abut at an angle. The other two crew members work in concert seating and/or setting the joint tape firmly over the joint and wiping excess joint compound away.

Currently, using the aforementioned skilled 3-person crew and taping process, the joint taping operation typically requires over 15 man-hours of labor and approximately 45 to 50+ gallons of joint compound per 10,000 sq. ft. of installed gypsum panels to perform the joint taping operation. During this time, the taping tool operator will need to refill the taping tool with joint compound over 50 times using a taping tool having a fixed volume capacity reservoir, which adversely affects productivity. This current taping operation using joint tape and joint compound materials can take over 24 hours to dry under good drying conditions, such as 75° F./50% relative humidity, before other joint finishing operations can be effectively performed.

SUMMARY

The above attributes are met or exceeded by the present automatic dispensing device for wallboard joint taping, embodiments of which feature the use of a designated adhesive that is distinct from conventional wallboard joint compound. By using such adhesive, the volume of material dispensed with the tape is reduced. Accordingly, the diameter and/or length of a main tubular housing of the device can correspondingly be reduced compared to standard taper tool body dimensions if desired. Otherwise, if a standard device housing is used, a result of the feature of lower volume of required adhesive relative to joint compound is that one filling of the housing with adhesive lasts several times longer than a device equipped for dispensing conventional joint compound.

Through the use of certain embodiments of the present tool, a three-person crew can effectively and significantly reduce the taping operation to approximately 5 man-hours or less and approximately 7 gallons or less of adhesive per 10,000 sq. ft. of installed gypsum panels to perform the joint taping operation. During this time, the taping tool operator will need to refill the taping tool with adhesive only 14 times using a taping tool having the same fixed volume capacity material reservoir as a standard taping tool currently in use in the marketplace. Using the joint tape and adhesive process, the taping operation material dries or cures in about 30 minutes or less after installation under the same good drying conditions, such as 75° F./50% relative humidity, before other joint finishing operations can be effectively performed.

In addition, the adhesive bond between the tape and the wallboard joint is improved compared to conventional taper tools using wallboard joint compound. Another feature of embodiments of the present tool is that it is mechanically designed to dispense and spread a controlled volume of adhesive or other viscous material evenly across the joint tape.

Still another feature of embodiments of the present tool is that the metering of the adhesive or other viscous material is closely matched with the typical 500 ft. length of joint tape on the reel attached to the tool body. The reservoir and the rate at which the material is dispensed may be adjustable to be coordinated with the length of the reel of tape. As such, tool operation and supplies are more efficiently administered, improving operational economy.

The above-identified advantages can be more specifically obtained by providing a modified gear drive between the ratchet gears or drive roller that rotatably contact the wall where the joint is being taped, and cause rotation of a drum or cylinder, used as a component in the windlass design, to wind a cable attached to a piston in the housing. As the cable draws the piston closer to a head or outlet end of the device, the piston pressurizes the adhesive in the housing and causes the emission of the adhesive from the housing and upon the tape. The improved "stepped down" gear drive reduces the rotation of the drum or cylinder relative to rotational movement of the ratchet gears, since less adhesive is required. In a preferred embodiment, an overall reduction of approximately 75% draw of the cable per distance of wall traversed or covered is achieved. In addition, there are at least 200 and approximately 300-500 rotations of the drive roller per load of adhesive in such embodiment. The drive roller diameter remains the same as the prior art to maintain high adaptability for end users.

The above-identified gear reduction is obtained by making the primary sprocket smaller, adding an idler gear that idles on a main chain drive post, and reduces the wear on the transmission by equally distributing the weight of the adhesive; the shape of the cog was redesigned (rounded off triangle shape); and the size of the chain was reduced to 3/16 inch pitch roller chain to reduce friction and smoother rolling is achieved, with a thinner tool profile. One example provides an external spur gear designed sprocket and dual chain drive mechanism that reduces flow rate by over 75% versus conventional drywall mechanical taping tools currently used in the marketplace today. Thus, for every gallon of joint compound dispensed by conventional taping tools, the present tool dispenses a quart of adhesive. Embodiments of the invention and novel delivery system effectively meter and control the flow of the adhesive, and employ a gate or spreader knife that effectively and efficiently spreads or disperses the adhesive evenly across one side of the joint reinforcement tape.

In addition, the diameter of the cable or drum is reduced in preferred embodiments so that less cable is used in relation to the rotational displacement of the drive rollers. This is important in reducing the amount of adhesive dispensed, and improved output consistency compared to conventional devices using joint compound.

Another feature of embodiments of the present device is that polymeric cable instead of metal cable is used to draw up the adhesive. Metal cable is suitable for dispensing joint compound; however, the smaller diameter of the drum and the reduced movement per rotation of the drive roller causes conventional metal cable to kink or otherwise wind unevenly. The present cable is preferably made of UHMW plastic, such as Dyneema® cord.

The drum or cylinder diameter becomes more significant when used in concert with thinner UHMW polymeric cable because the cable windings around the cylinder will not significantly change the drum or cylinder diameter, which in turn enables a consistent dispense rate in the operation of a windlass design. Whereas, windings over the drum cylinder using a metal cable will increase the actual diameter of the drum cylinder and will change the dispense rate and operation of a windlass design.

Still another feature of embodiments of the present device is that wedge-shaped inserts are added to the dispensing outlet of the adhesive so that the conventional outlet dimension is significantly reduced. This reduction creates a back-up or head of adhesive, so that the adhesive is evenly emitted across the width of the outlet, and evenly covers the tape surface. Preferably, one wedge is secured to the cap of the device, and another is secured to the gate to form a narrowed nip. Overall, the present tool features less wear and tear on the unit compared to conventional taper tools dispensing joint compound, and reduced waste of material dispensed.

More specifically, an automatic dispensing device for wallboard joint taping is provided, including a body for holding a supply of adhesive material and having a rear end and an opposite front end, a spool assembly disposed on the body and configured for supporting a spool of tape; at least one drive roller positioned at the front end and receiving an end of the spool of tape. An adhesive application assembly is connected to the drive roller and mounted in operational relationship to the front end for dispensing a measured amount of adhesive upon a surface of the tape upon rotation of the at least one drive roller. The body is configured for holding sufficient adhesive to cover tape advanced by at least 200 rotations of the at least one drive roller.

In another embodiment, a method of retrofitting a wallboard tape dispensing device is provided, including connecting a drive roller with a cable drum using multiple power transmission elements and toothed sprockets so that a supply of adhesive in a body of said device is sufficient for coating 500 feet of wallboard joint tape; reducing a diameter of a cable drum; and reducing a volume of dispensed composition approximately 75% compared to conventional tape dispensing devices using wallboard joint compound.

In a further embodiment, an automatic tape dispensing device is provided including a polymeric cable connecting a cable drum acting as a windlass and a piston that reciprocally moves within a body configured to hold a supply of viscous material within the device.

In a still further embodiment, a head for a tape dispensing device is provided, including a drive roller positioned on a front end of the head and configured to receive an end of a spool of tape, an adhesive application assembly connected to the drive roller and mounted in operational relationship to the front end for dispensing a measured amount of adhesive upon a surface of the tape upon rotation of the drive roller, a cable drum connected to the drive roller for joint rotation, and a cable connected at one end to the drum and at an opposite end to a piston. The drive roller connected to the drum by a first and second power transmission member, the drive roller including a drive shaft with a drive gear, and is connected by the first power transmission member to an idler gear with an idler shaft and sprocket, and the second power transmission member is connected to the idler sprocket and to a drum sprocket, so that rotation of the drive roller acts through the first and second power transmission members to rotate the drum.

In still another embodiment, a tape dispensing device is provided including a mechanism for adjusting the ratio of viscous material dispensed to tape dispensed.

In yet a further embodiment, a head is provided for a tape dispensing device, including a drive roller positioned on a front end of the head and configured to receive an end of a spool of tape, an adhesive application assembly connected to the drive roller and mounted in operational relationship to the front end for dispensing a measured amount of adhesive upon a surface of the tape upon rotation of the drive roller, the adhesive application assembly including a detachable cap connected to the head, the cap partially defining an outlet of the adhesive, a gate in the head and being constructed and arranged to complement said cap and partially define said outlet; and at least one of the cap and the gate having a reducer configured for reducing the size of the outlet.

BRIEF DESCRIPTION OF THE DRAWINGS

FIG. 10 is a side elevation of the embodiment of the device depicted in

FIG. 9;

DETAILED DESCRIPTION

Figure 1:
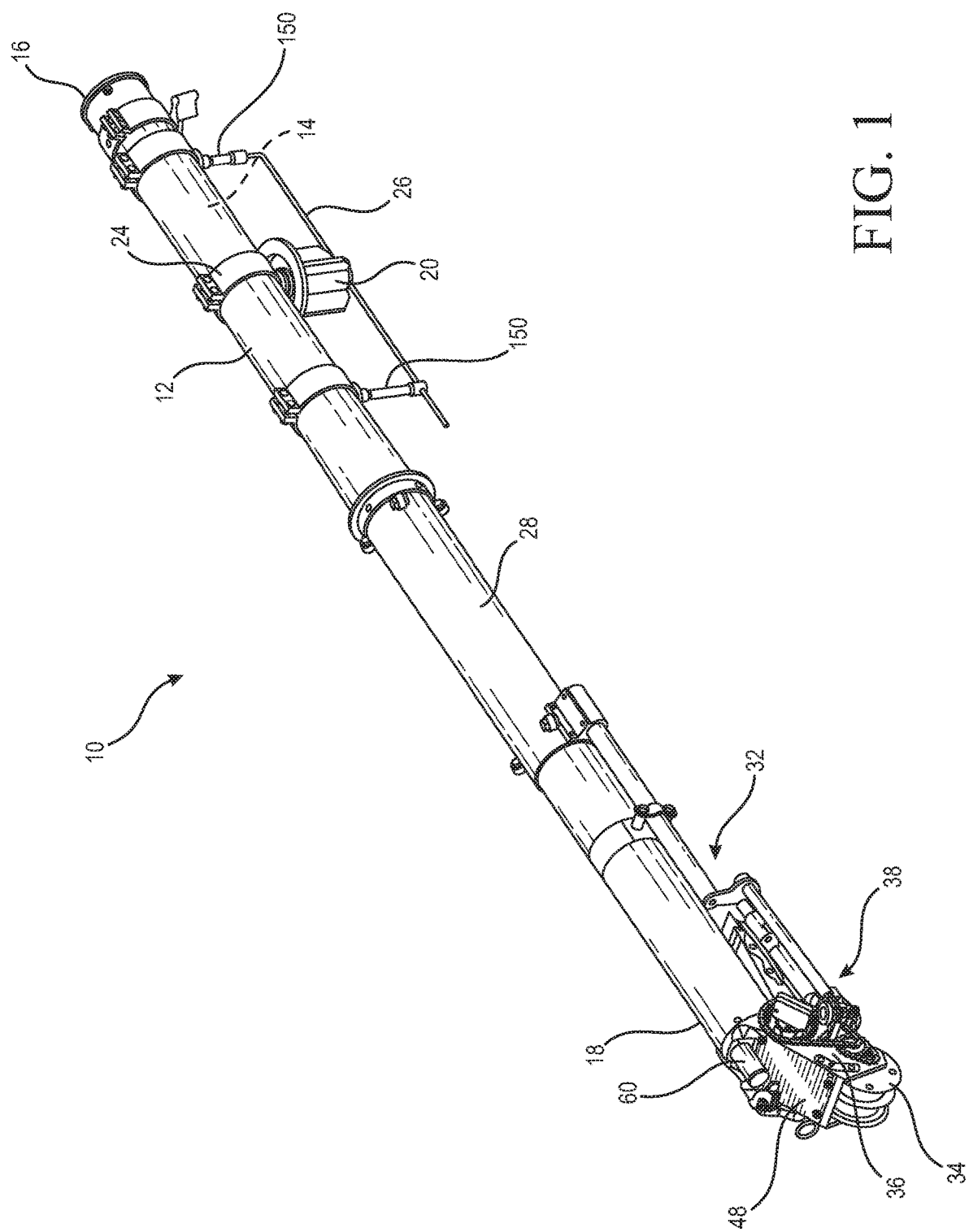
FIG. 1 is a top perspective assembled view of an embodiment of the present joint tape dispensing device.
Figure 2:
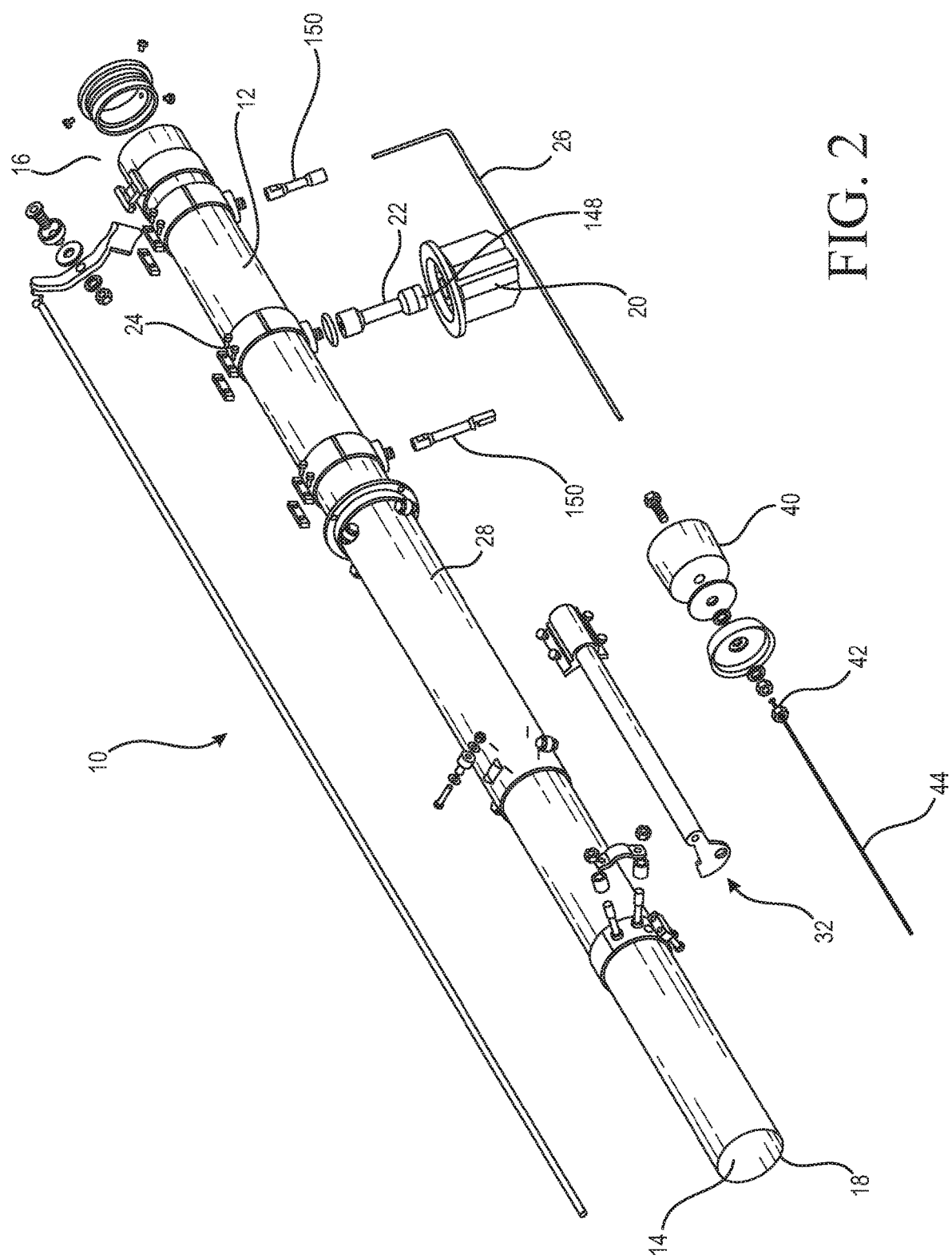
FIG. 2 is a fragmentary exploded perspective view of the device of FIG. 1.

Referring to FIGS. 1 and 2, an automatic wallboard tape-dispensing device, also referred to as a taper tool, is generally designated 10. The taper tool 10 has some common structure with the taper tools described in U.S. Pat. Nos. 4,086,121; 6,874,557 and 7,624,782, all of which are incorporated by reference. Some of the common structures between the taper tool 10 of the present invention and the taper tools described in such patents generally relates to feeding tape, delivering tape, creasing tape, cutting tape and the general design and operation of taper tools, except as otherwise described hereafter.

The taper tool 10 preferably includes a body 12 generally having the shape of a hollow tube or cylinder for defining a chamber 14 configured for holding a supply of an adhesive which may be distinguished from conventional wallboard joint compound used in conventional taping tools of the type disclosed in the above-listed patents. An important feature of certain embodiments of the present tool 10 is that they are configured for dispensing adhesive instead of joint compound. "Joint compound" is a term well known in the art and refers to a settable composition that is used to fill joints between adjacent sheets of wallboard. Exemplary types of joint compound are disclosed in commonly assigned U.S. Pat. Nos. 6,673,144; 5,534,059; and 5,746,822, among many others. Embodiments of the present adhesive differ from joint compound in that they do not provide a traditional patching or filling function between the adjacent panels. Instead, the adhesive has a principal function of securing the wallboard joint tape to the adjacent panels to cover the wall joint.

Included on the body 12 is a rear end 16, preferably open and unplugged, and an opposite front end 18. A spool 20 is rotatably secured to the body 12 and is dimensioned for receiving and supporting a roll of joint tape (not shown). The spool 20 rotates about a shaft 22 transversely mounted to the body 12 as by a clamp or band 24. As is known in the art of taper tools, a removable keeper spring 26 may be used to retain the roll of tape on the spool 20. An actuator or sleeve 28 is preferably slidably mounted on the body 12 for feeding a web 30 of the tape (FIG. 4) to the front end 18 of the taper tool 10, and for actuating a cutting knife (not shown) to cut the tape. The joint reinforcement tape serves the purpose of concealing the gypsum panel edges that create joints or seams when two or more gypsum panels are installed edge to edge, at any angle, or across a plane or framed wall. The joint reinforcement tape can be fabricated using many types of materials. The joint reinforcement tape assists in controlling joint cracking after the joint tape is bonded to the panel seams using a suitable adhesive material, and further assists in visually concealing the joint when joint finishing compound materials are applied over the taped joint seam. A multi-shaft linkage 32 connects the actuator 28 with the front end 18 of the body for completing the above-listed operations, and is described in more detail in U.S. Pat. No. 7,624,782.

At the front end 18 of the body 12 is at least one drive roller or ratchet gear 34 which is rotatably held in a bracket-like head or head housing 36 that is fixed to the front end 18 of the body 12, includes a pair of side plates 37 and provides a mounting point for both the drive roller and an adhesive application assembly, generally designated 38. The drive roller 34 receives an end of the joint tape and advances the tape from the roll on the spool 20, while adhesive is applied to the tape. A piston 40 is slidably and reciprocably located within the body 12 and is secured to an end 42 of a cable 44, which is connected at an opposite end 46 (FIG. 4) to the adhesive application assembly 38. Unlike the steel cables used in traditional taper tools dispensing joint compound, the present cable 44 is made of plastic or other non-metallic material which is more amenable to the relatively tighter rolling environment of the reduced diameter cable drum, described in greater detail below. In the preferred embodiment, the cable 44 is UHMW plastic, and it is still further preferred that the cable is made of Dyneema® cord. In operation, the adhesive application assembly 38 is connected to the drive roller 34 for dispensing a measured amount of adhesive upon an upper surface of the tape upon rotation of the drive roller.

One feature of preferred embodiments of the present taper tool 10 is that the body 12, which is a size that is standard for such tools, holds approximately 1 gallon of adhesive. Such tool 10 is configured for dispensing 1 gallon on 250 linear feet of joint tape, so that 500 feet of tape is coverable by 2 gallons, or one refill of the body 12. When using conventional joint compound, a taper tool must be refilled 7-8 times due to the relatively higher rates of application of joint compound compared to the present adhesive. Thus, preferred embodiments of the present taper tool 10 use approximately 25-30% less material dispensed with the tape compared to conventional tools dispensing joint compound. Another parameter is that the body 12 may be configured for holding sufficient adhesive to cover tape advanced by at least 200 and more preferably approximately 300-500 rotations of the at least one drive roller 34.

Figure 3:
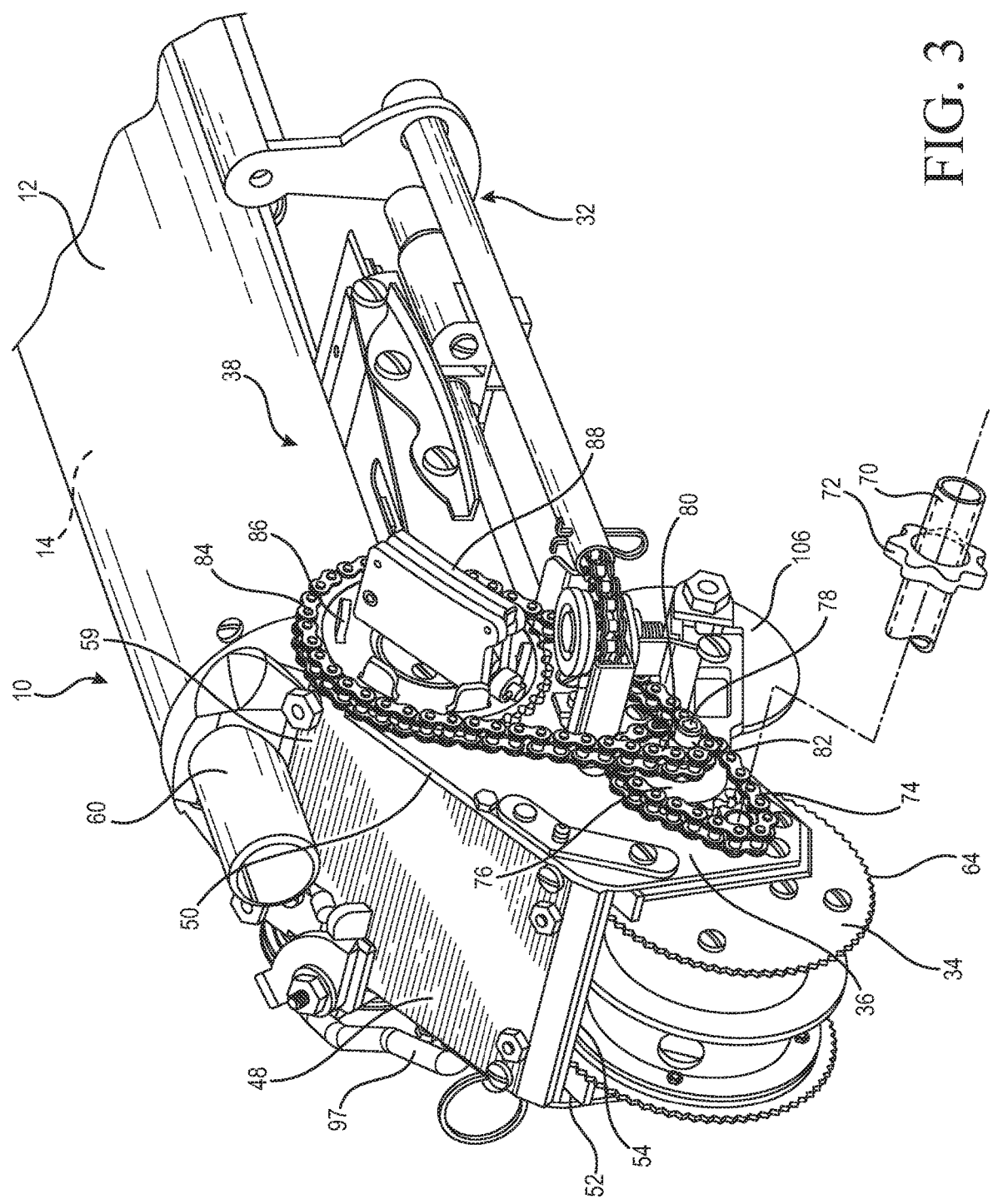
FIG. 3 is a fragmentary, partially exploded front perspective view of an embodiment of the present dispensing device.
Figure 4:
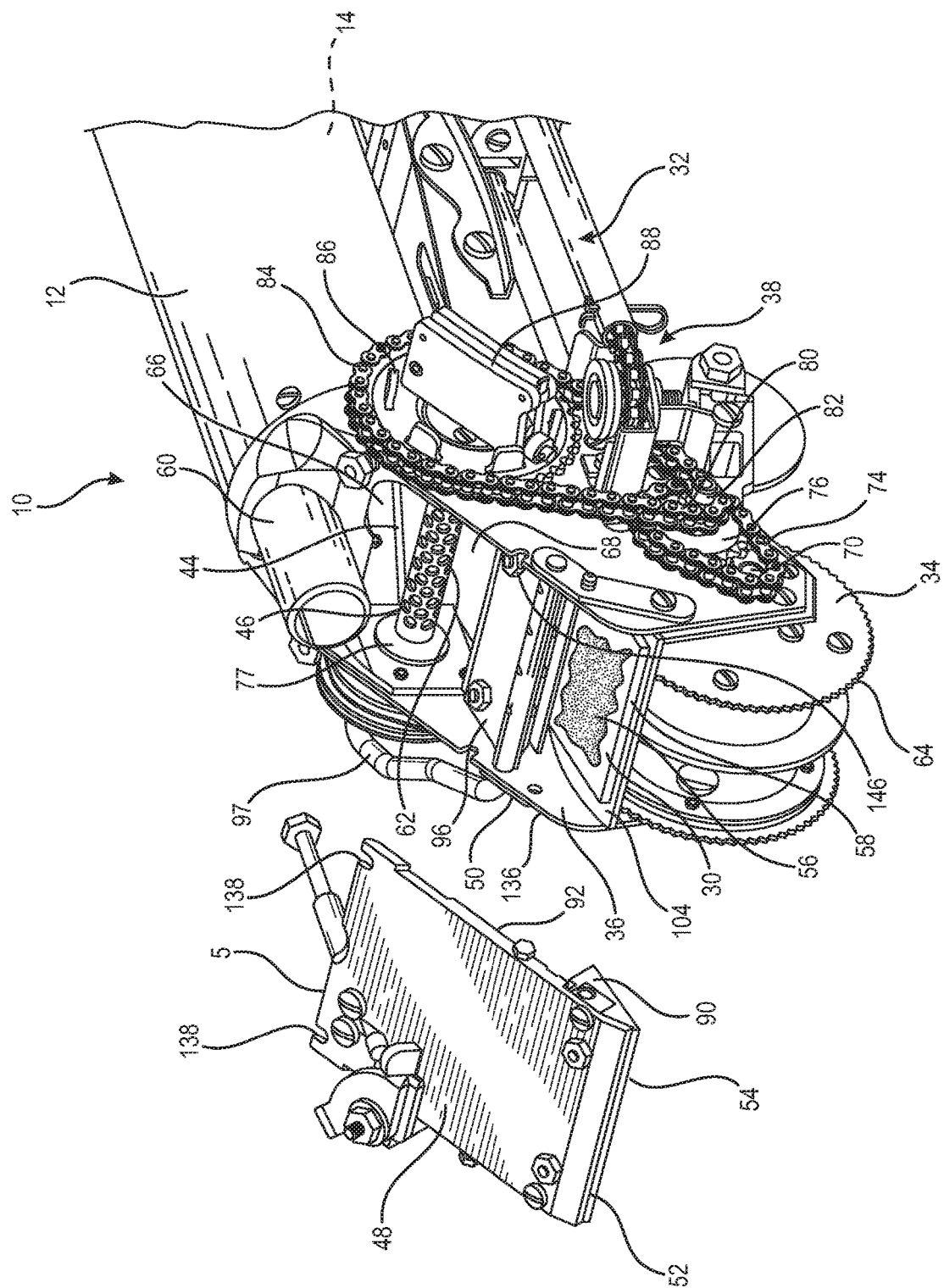
FIG. 4 is a fragmentary front perspective view of an embodiment of the present dispensing device with the cap shown exploded away.
Figure 5:
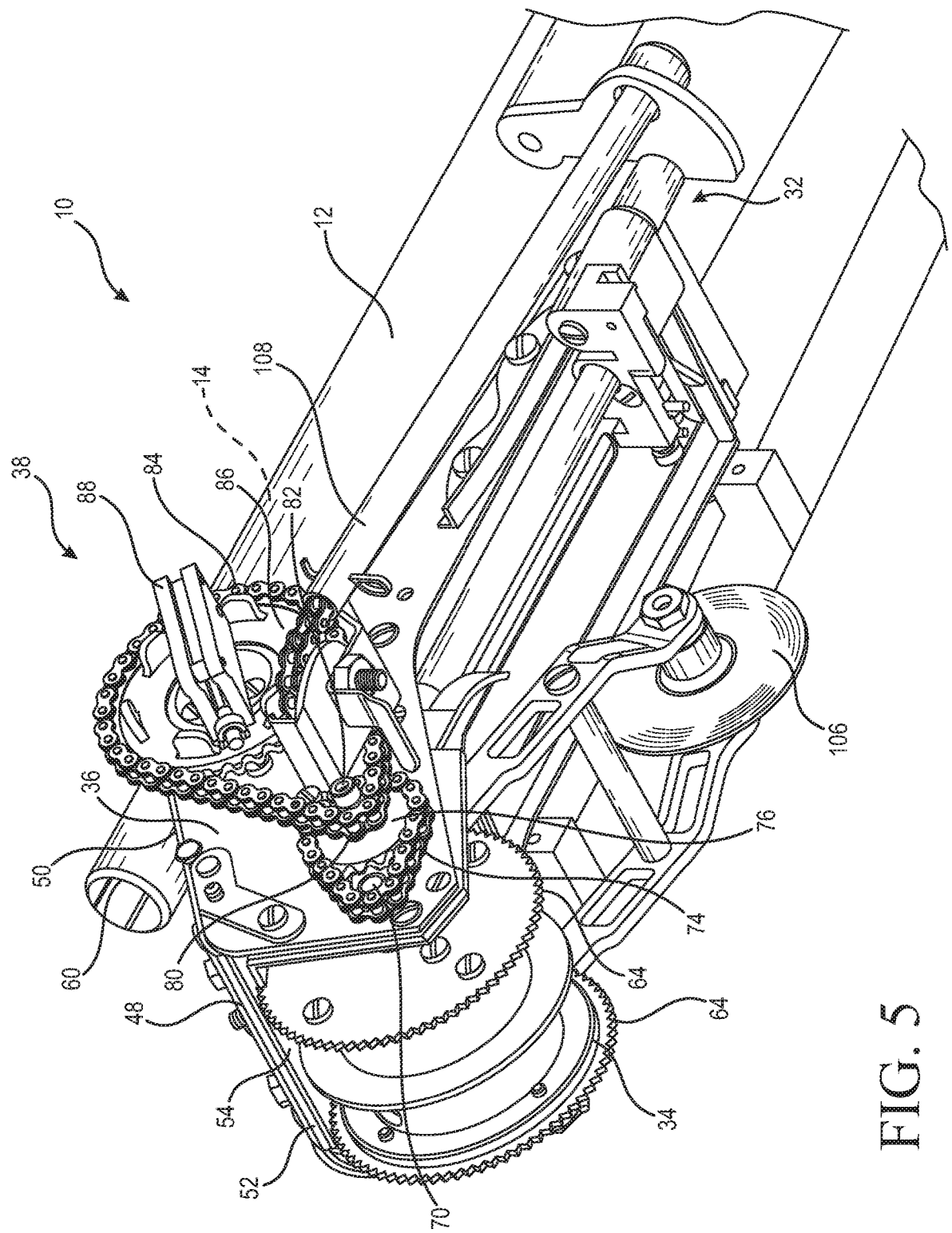
FIG. 5 is a fragmentary bottom perspective view of an embodiment of the present dispensing device.

Referring now to FIGS. 3-5, the head housing 36 is provided with a plate-like cap 48 that is removably secured to an angled upper edge 50 of the head housing. A lower edge 52 of the cap 48 partially defines an outlet 54 through which the web 30 of joint tape and a coating of adhesive 56 are dispensed for application upon a wall joint. As described above, the adhesive 56 is preferably almost completely covering an upper surface 58 of the web 30, and is chemically distinguishable from conventional joint compound. More specifically, the adhesive 56 acts to mechanically bond or bind the joint reinforcement tape 30 to abutting gypsum panels over the joint seam to resist physical separation. The adhesive 56 further assists the joint reinforcement tape in providing, in part, a crack resistant joint system by evenly distributing stress more efficiently across the joint seam. The wet applied adhesive converts to a solid film when dry.

Although any adhesive base formulation could be dispensed through the tool 10, in preferred embodiments, a stable, low yield stress thixotropic fluid that possesses a shear thinning with rapid recovery characteristic is preferred. The composition of the adhesive 56 includes a relatively lightweight, low solids, water based acrylic latex dispersion. It is further preferred that the adhesive 56 impart certain other physical properties and provide significant open time and workability to enable practical installation under typical jobsite construction conditions, yet when set into place following the taping operation dries or cures in about 30 minutes or less after installation is desirable.

A suitable joint reinforcement tape adhesive that imparts the aforementioned physical properties can be found in product formulations similar to professional grade water-based wallpaper paste for high humidity areas such as is found in kitchen and bath applications. As an example, GH-95 Kitchen and Bath wallpaper paste manufactured by Roman Decorating Products provides acceptable performance.

Figure 8:
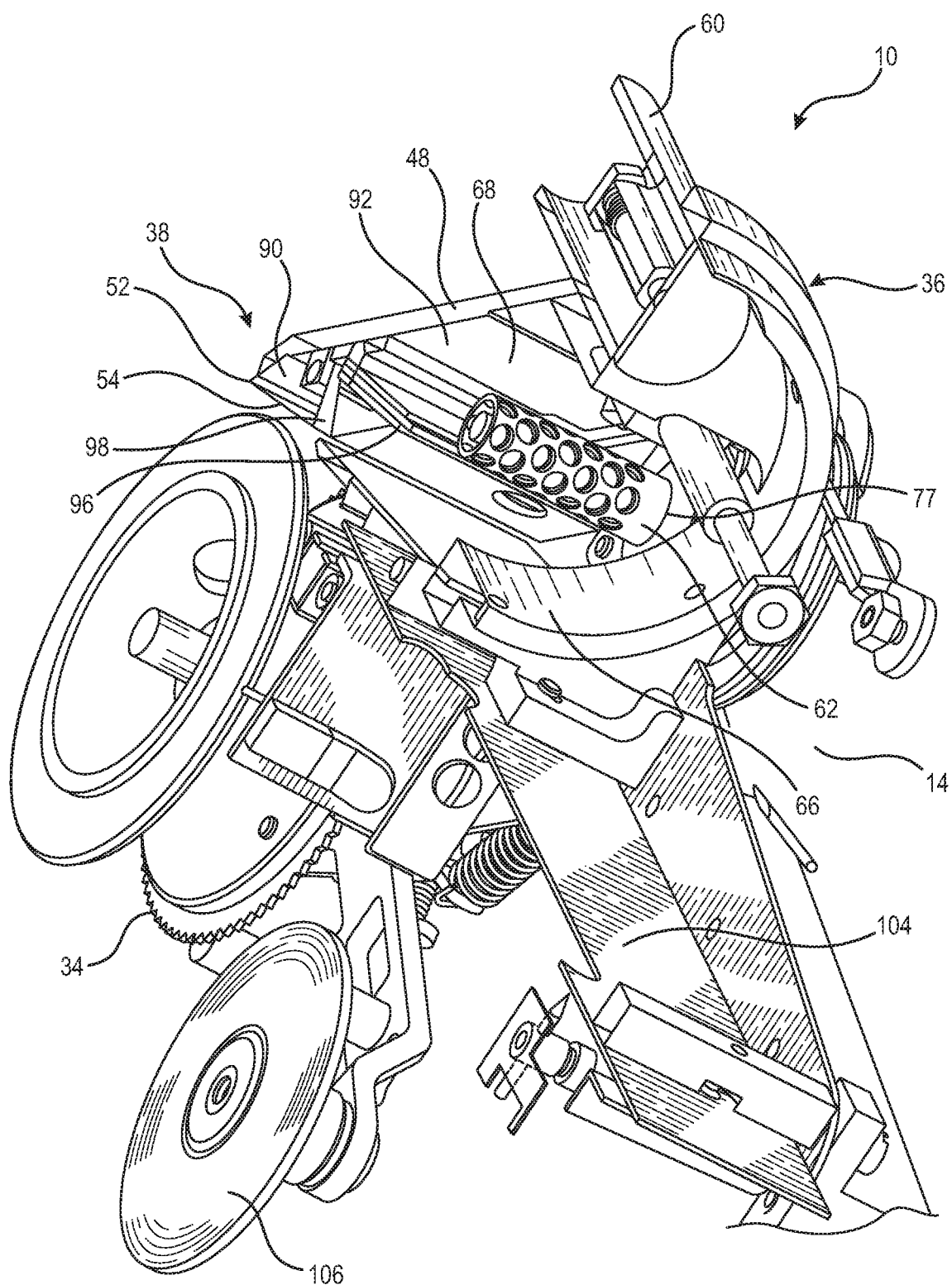
FIG. 8 is a fragmentary rear perspective of an embodiment of the present adhesive outlet formed by the wedge assemblies.

Adjacent an upper end 59 of the cap 48 is a tubular inlet port 60 through which the adhesive 56 is pumped into the body 12 in a similar manner as used for filling taper tools with joint compound. As is the case with conventional taper tools, the present tool 10 operates by a user moving the tool along a wall joint so that the drive roller or rollers 34 rotate along the wall. That rotation ultimately causes similar rotation of a cable drum 62, mounted in spaced, parallel orientation on the head housing 36. This rotation also advances the web 30 of joint tape, since the drive rollers 34 are provided with peripheral teeth 64 for advancing the tape. At the same time, the rotation of the cable drum 62 which is connected to the cable 44, pulls the cable and the associated piston 40 towards the front end 18, thus pressurizing the adhesive 56 in a forward direction, towards an adhesive outlet 66 (FIGS. 4 and 8). As the piston 40 moves forward, the adhesive 56 fills an interior 68 of the head housing 36, and is retained in the interior by the cap 48.

Referring now to FIGS. 3-5, an important feature of preferred embodiments of the present taper tool 10 is that the amount of rotation of the cable drum 62 in relation to the rotation of the drive rollers 34 is significantly reduced, since less of the adhesive 56 is dispensed per linear inch of joint tape than is the case with conventional taper tools dispensing joint compound. One manner in which the drum rotation is decreased is a reduction in the gear ratio between the drive rollers 34 and the cable drum 62. More specifically, in a preferred embodiment, the drive rollers 34 are rotatably engaged in the head housing 36 by a drive shaft 70 fitted with a toothed drive gear 72 (FIG. 3). A first transmission member 74, in this case being a linked chain, however other types of belts or cables are contemplated, engages the drive gear 72 and also a relatively larger diameter idler gear 76. In such embodiments, it is preferred that the chain 74 is sized as ³⁄₁₆-inch pitch roller chain to reduce friction and smoother rolling is achieved, with a thinner tool profile. The idler gear 76 freely rotates on an idler shaft 78 secured to the head housing 36. An idler sprocket 80 near an extended end 82 of the idler shaft 78 engages a second power transmission member 84, preferably a similar type of chain to the member 74.

The second power transmission member 84 connects a relatively larger diameter drum sprocket 86 to the idler sprocket 80. A fixed connection between the components ensures that the drum sprocket 86 and the cable drum 62 rotate together. Also connected to the drum sprocket 86 for common rotation is a manual advance actuator or key 88 configured for grasping by the user for manually advancing the cable drum 62 and thus priming the interior 68 of the head housing with the adhesive 56.

By adding the idler gear 76 and the additional first power transmission member 74, the ratio of drum rotation to drive roller rotation is reduced. Further reduction is achieved by decreasing the diameter of the cable drum 62 from that of conventional taper tools dispensing joint compound. In addition, preferred embodiments include shoulders 77 of the cable drum 62 that are thinner than those of a cable drum in a joint compound-dispensing taper tool to reduce the amount of ride over of the cable 44 as the cable becomes rolled on top of itself. This ride over increases the amount of the adhesive 56 that comes through because of the reduced diameter of the drum 62 so more cable gets pulled up per revolution.

Referring now to FIGS. 4 and 8, to achieve a relatively uniform coating of the adhesive 56 upon the upper surface 58 of the joint tape 30, the flow of the adhesive from the interior 68 of the head housing 36 is relatively restricted, in view of the reduced volume of material. It has been found that in preferred embodiments of the present tool 10, the amount of adhesive dispensed per linear foot of joint tape is reduced approximately 65% compared to conventional tapers dispensing joint compound.

Figure 6:
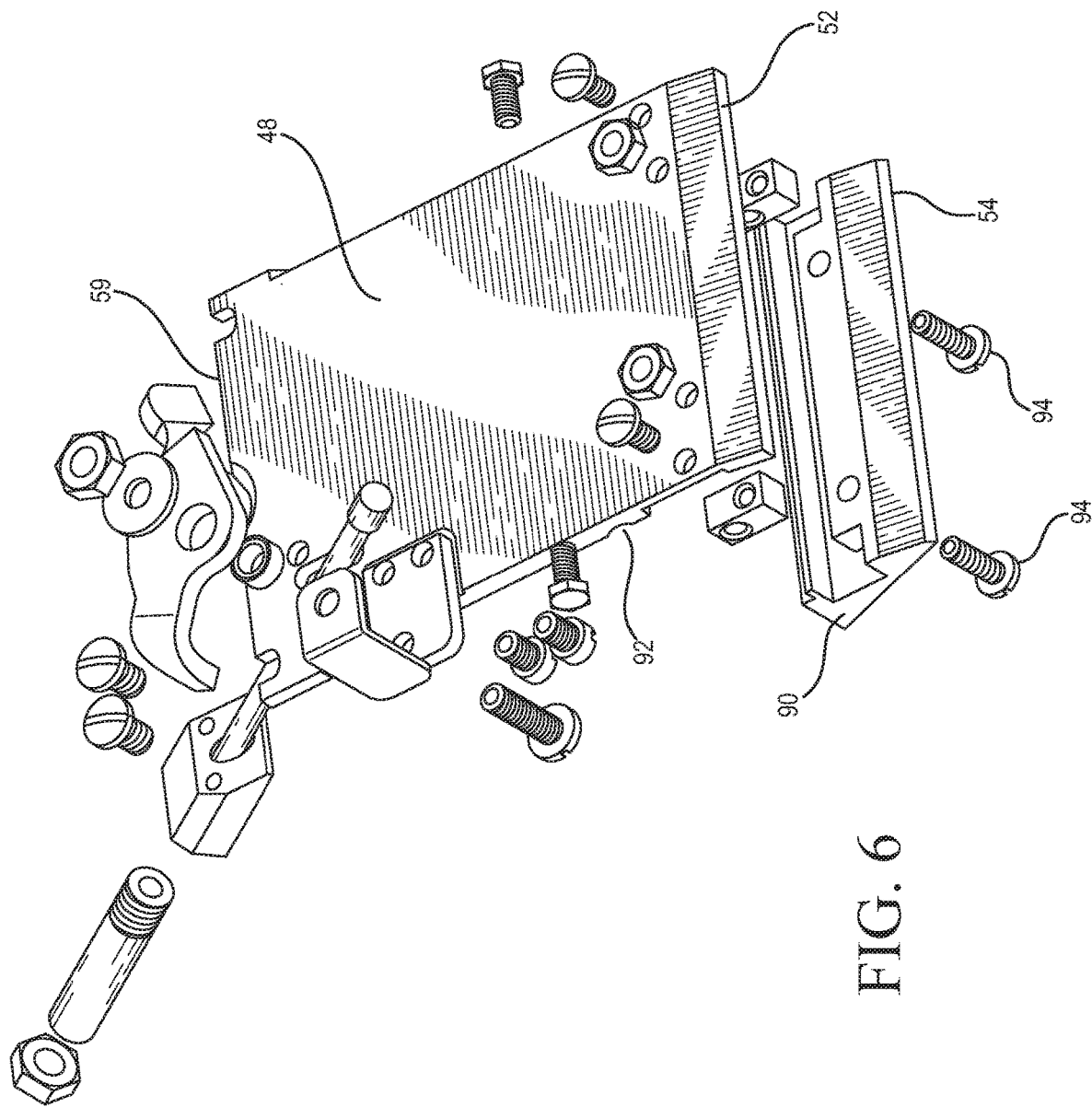
FIG. 6 is an exploded top perspective view of an embodiment of the present cap and wedge assembly.
Figure 7:
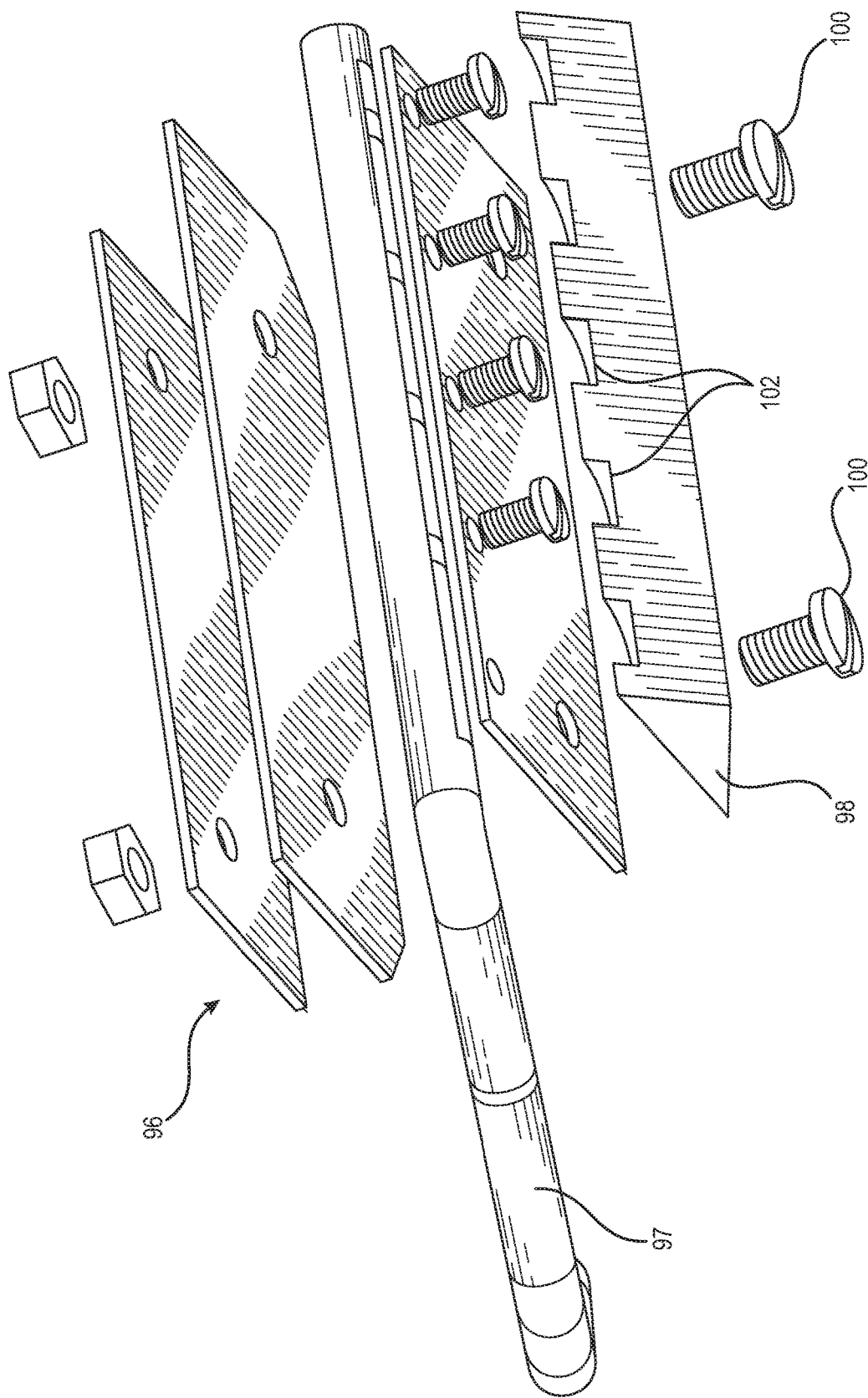
FIG. 7 is an exploded front perspective view of an embodiment of the present gate wedge assembly.

Referring now to FIGS. 4, and 6-8, one way that this reduced volume is accommodated for more uniform coverage of the joint tape is the provision of a cap reducer 90 on an underside 92 of the cap 48. Assembled to the cap 48 using fasteners 94 as seen in FIG. 6, the cap reducer 90 is preferably wedge-shaped when viewed from the side, and thus restricts flow of the adhesive 56 from the outlet 54. In addition, in the head housing 36 defines a gate 96 through which the adhesive 56 passes, and which is adjustable in the manner of a butterfly valve through user manipulation of a gate arm 97. Thus, in the head housing 36, further adhesive flow restriction is created by a gate reducer 98 configured to complement the cap reducer 90. As is the case with the cap reducer 90, the gate reducer 98 may be secured to the gate by fasteners 100 and is generally wedge-shaped when viewed from the side. In addition, both of the reducers 90, 98 extend the width of the cap 48 to enhance the even flow of the adhesive 56 through the outlet 54 by defining a reduced profile of the outlet that creates a back-up of the adhesive 56 in the head housing 36. Thus, the reducers 90, 98 more evenly spread the adhesive 56 across the tape 30. In one embodiment, at least one of the cap reducer 90 and the gate reducer 98 are provided with spaced notches 102 (FIG. 7) defining outlets for the adhesive 56.

As seen in FIGS. 4 and 8, both of the cap reducer 90 and the gate reducer 98 are preferably located above a track 104 for feeding the tape from the spool 20 to the front end 18 of the body 12. Also, as is the case with certain prior art taper tools, embodiments of the present tool 10 are equipped with a retractable corner wheel 106, and include a knife actuation chain mechanism 108 (FIG. 5).

Figure 9:
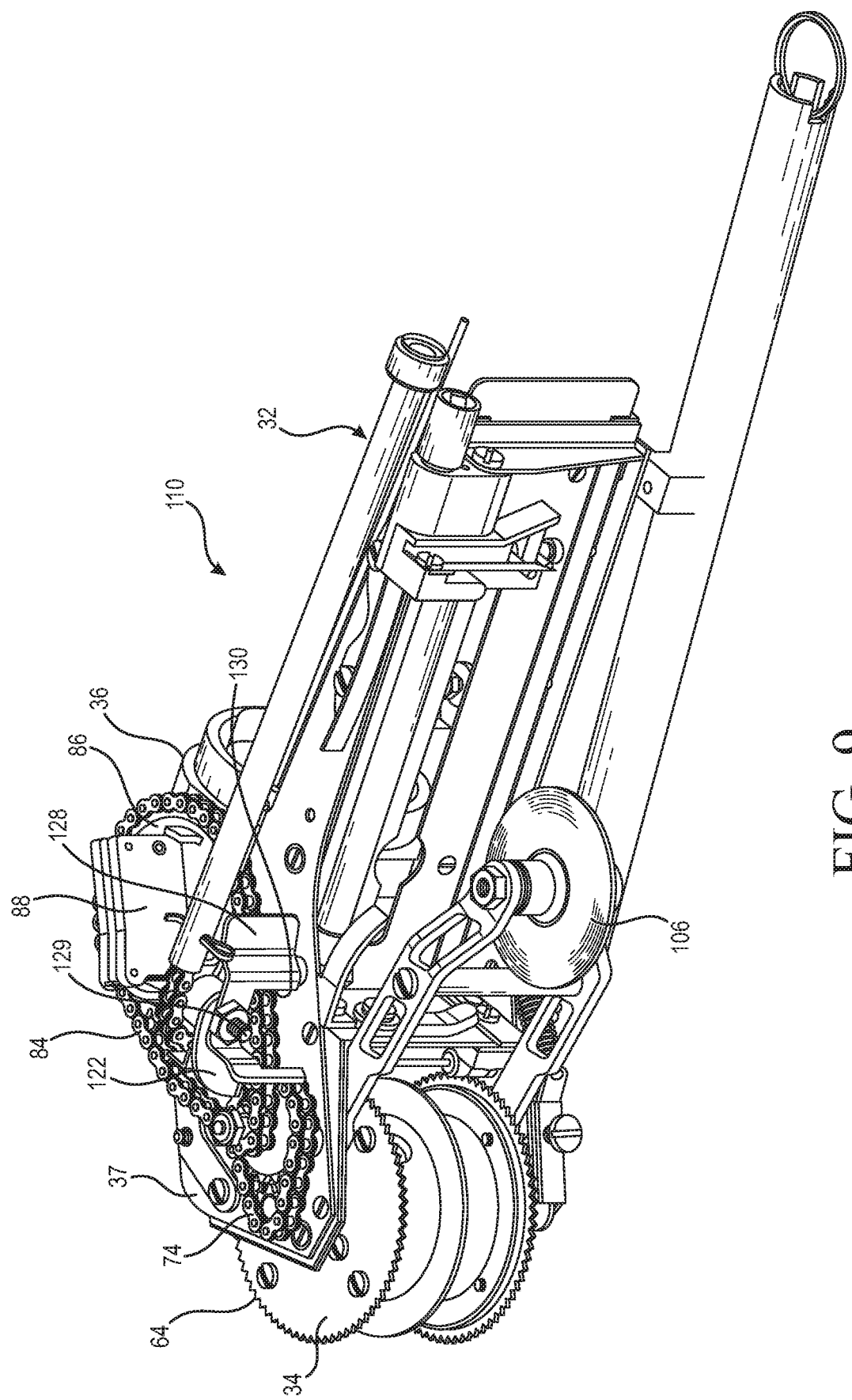
FIG. 9 is a fragmentary bottom perspective view of an alternate embodiment of the present dispensing device depicted in FIG. 3.
Figure 10:
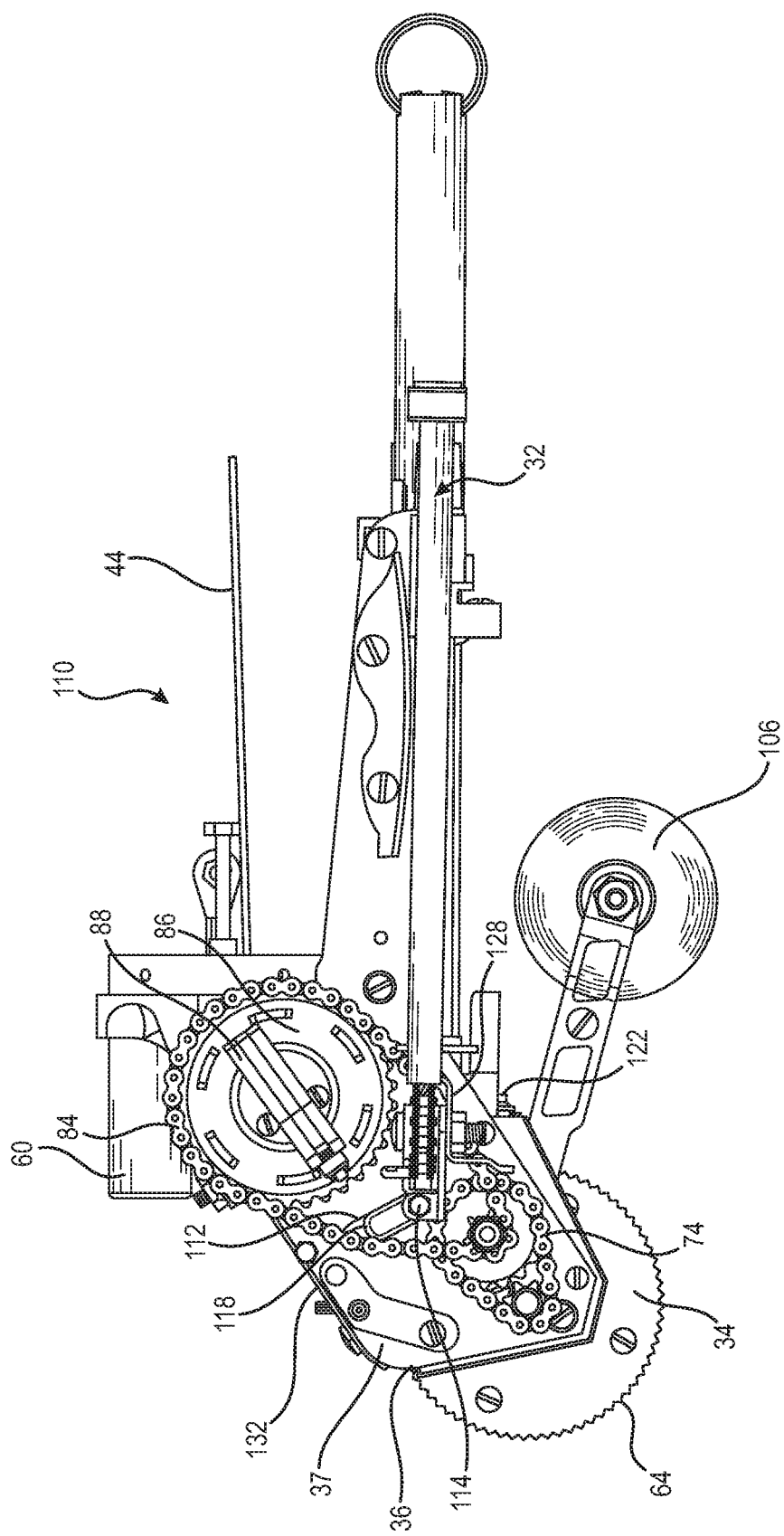
Figure 11:
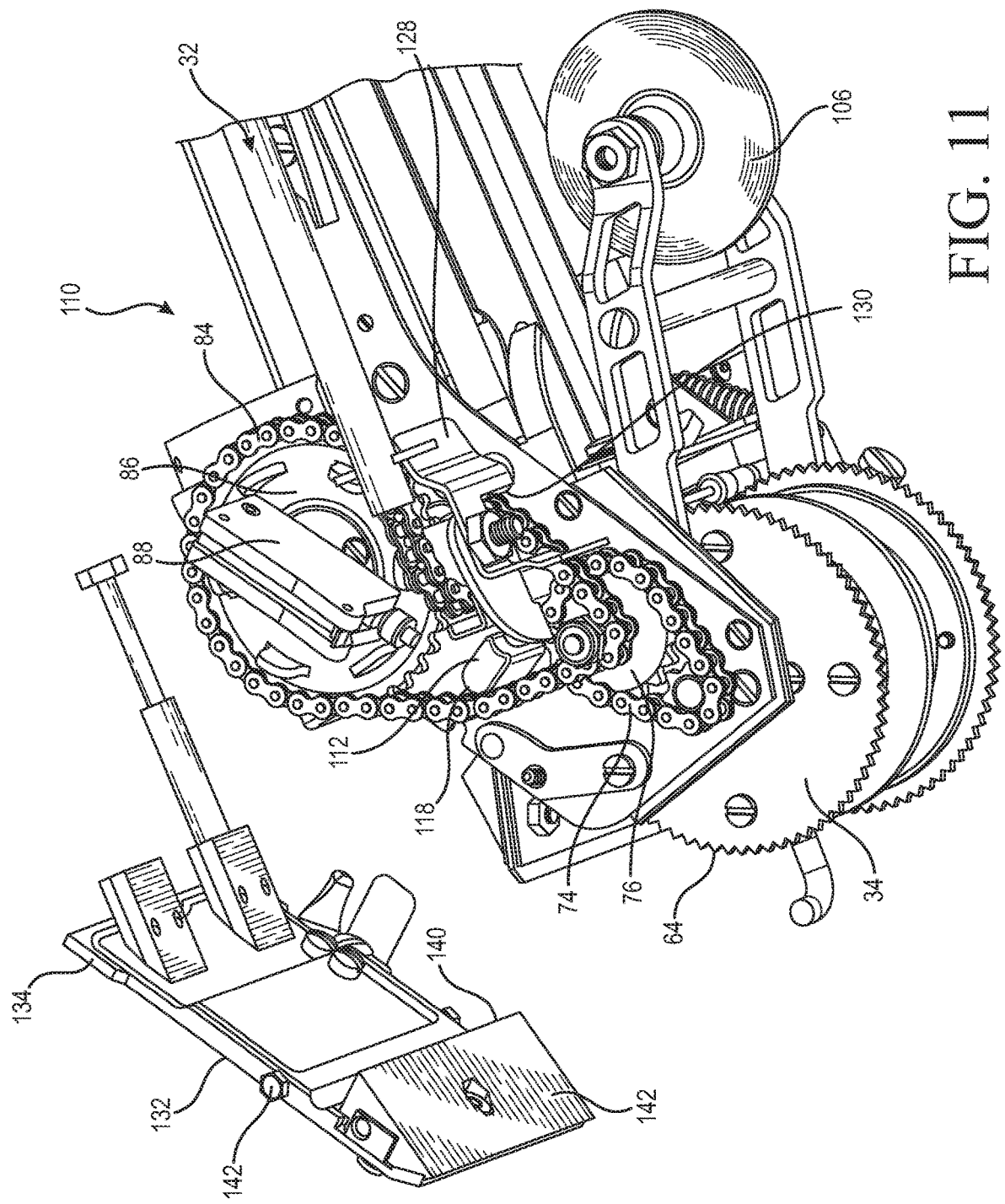
FIG. 11 is a fragmentary, exploded, bottom perspective view of the device shown in FIG. 9.
Figure 12:
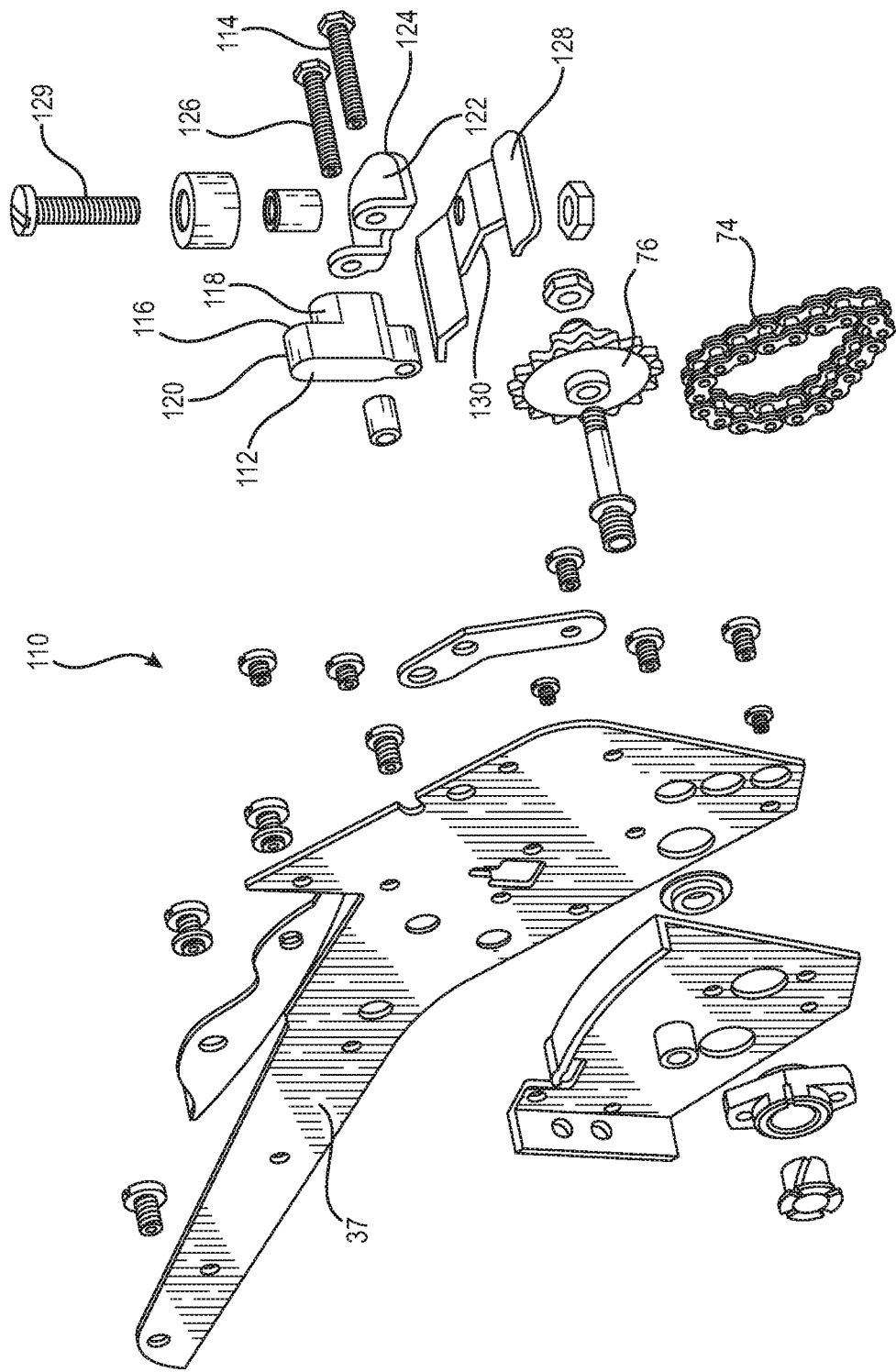
FIG. 12 is a fragmentary, exploded front perspective view of the device of FIG. 9.

Referring now to FIGS. 9-13, an alternate embodiment of the present dispensing device is generally designated 110. Components shared with the device 10 are designated with identical reference numbers. The devices 10 and 110 are interchangeable and are basically the same device, with the device 110 including several enhancements. One distinctive feature of the device 110 is a chain tensioner 112 mounted to the side plates 37 of the head housing 36. The chain tensioner 112 is pivotably attached to one of the side plates 37 using a threaded fastener 114 such as a screw. In shape, the chain tensioner 112 has a stepped end 116 defining a shoulder 118. A longer portion 120 of the stepped end 116 spaces the second power transmission member 84, preferably a linked chain, away from the head housing 36. In operation, the member 84 rides, or is fed over the shoulder 118 (FIG. 10), and rotation of the chain tensioner 112 about the fastener 114 relative to the head housing 36 moves the shoulder 118 in an arc, and is used to adjust the tension on the member/chain 84. Referring now to FIGS. 9 and 12, another feature of the device 110 is a chain guide flange 122, also mounted to the side plate 37 of the head housing 36 for enhancing the guiding of the member/chain 84. In the preferred embodiment, the chain guide flange 122 is a plate being generally semi-circular or ovate in shape when viewed from above, with a radiused outer periphery 124, however the shape may vary to suit the application. As is the case with the chain tensioner 112, the chain guide flange 122 is fastened to the side plate 37, using fasteners 126 and 114, such as conventional screws or the like. A chain guide bracket 128 is secured to the chain guide flange 122 using a bolt 129 and nut or the like. The bracket 128 also defines an opening 130 through which the power transmission member 84 is routed for enhanced guiding and for preventing binding up of the member. The chain guide flange 122 and the bracket 128 work together to maintain a desired alignment of the power transmission member 84.

Figure 13:
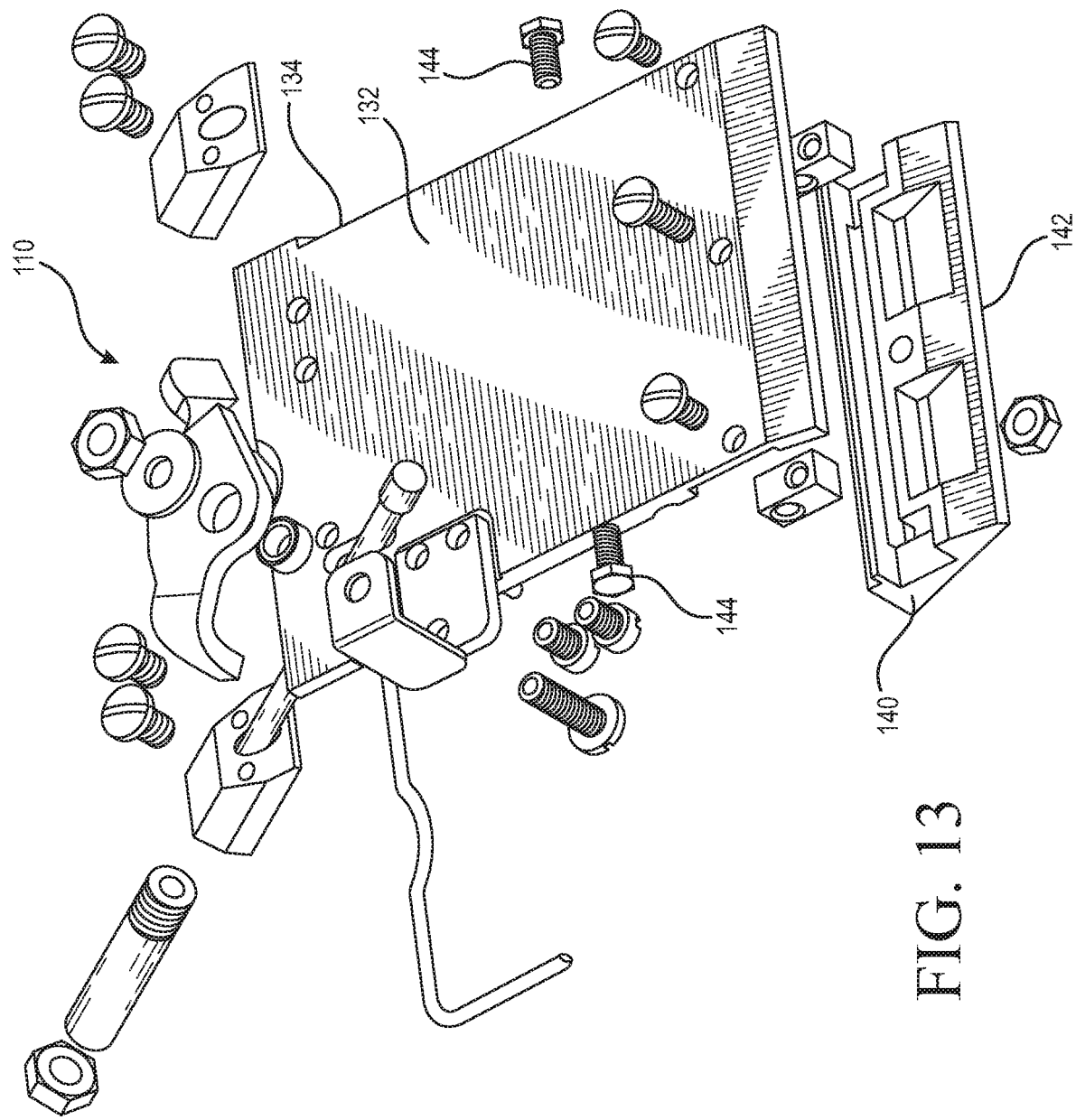
FIG. 13 is a fragmentary, exploded front perspective view of the device of FIG. 9.

Referring now to FIGS. 11 and 13, a new cover plate is shown, designated 132. While the cover plate 132 is overall quite similar to the plate 48, distinctive features over the plate 48 include a more continuous peripheral edge 134 that more positively engages an edge 136 (FIG. 4) of the adhesive outlet 88 of the head housing 36 for resisting leakage of adhesive during operation. The plate 48 has notches 138 (FIG. 4) that are prone to adhesive leakage. Also, the new cover plate 132 fits more tightly upon the head housing 36, so that there is reduced leakage of adhesive. Still another feature of the cover plate 132 is that an improved cap reducer 140 has a more uniform, planar lower surface 142 compared to the cap reducer 90 for more evenly spreading the dispensed adhesive 56. As is the case with the cover plate 48, the plate 132 is held in place on the housing 36 with screws 144 engaging notches 146 (FIG. 4).

Referring again to FIGS. 1 and 2, the spool 20 is preferably not freely rotatable about the shaft 22. Such free rotation has been known to cause unwanted unraveling of the roll of joint tape mounted on the spool 20. It is preferred that the spool 20 is mounted to the shaft 22 using a bushing 148 that resists rotation of the spool. The bushing 148 is preferably made of a resilient, rubber-like material, however other rotation-resisting devices are contemplated. Also, the rod or keeper spring 26 is releasably secured to the tool body 12 by supports 150 threadably attached to the body at one end, and machined or configured at the opposite end for accommodating the spring 26.

While particular embodiments of the present automatic dispensing device for wallboard joint taping have been described herein, it will be appreciated by those skilled in the art that changes and modifications may be made thereto without departing from the invention in its broader aspects and as set forth in the following claims.

The invention claimed is:

1. A head for a tape dispensing device, the head comprising:
   a drive roller positioned on a front end of the head and configured to receive an end of a spool of tape;
   an adhesive application assembly connected to the drive roller and mounted in operational relationship to said front end for dispensing a measured amount of adhesive upon a surface of the tape upon rotation of said drive roller;
   a cable drum connected to said drive roller, and a cable connected at one end to said drum and at an opposite end to a piston; said drive roller connected to said drum by a first and second power transmission member;
   said drive roller comprising a drive shaft with a drive gear, and is connected by said first power transmission member to an idler gear with an idler shaft and sprocket, and said second power transmission member is connected to said idler sprocket and to a drum sprocket, so that rotation of said drive roller acts through said first and second power transmission members to rotate said drum.

2. A head for a tape dispensing device, the head comprising:
   a drive roller positioned on a front end of the head and configured to receive an end of a spool of tape;
   an adhesive application assembly connected to the drive roller and mounted in operational relationship to said front end for dispensing a measured amount of adhesive upon a surface of the tape upon rotation of said drive roller;
   said adhesive application assembly including a detachable cap connected to said head, said cap partially defining an outlet of the adhesive;
   a gate in said head and being constructed and arranged to complement said cap and partially define said outlet; and
   at least one of said cap and said gate having a reducer configured for reducing the size of said outlet, said reducer being wedge-shaped when viewed from a side and being positioned adjacent said gate and between said cap and said gate to reduce the size of said outlet by a thicker end of said wedge being farther from said outlet, and a relatively tapered, pointed end of said wedge being closer to said outlet.

3. The head of claim 2, wherein both of said cap and said gate have corresponding reducers.

4. The head of claim 3, wherein both of said reducers are wedge-shaped when viewed from a side.

5. The head of claim 3, wherein said cap reducer and said gate reducer together act as a spreading knife and create a back-up of adhesive in a head housing in said body for more evenly spreading the adhesive upon the tape.

6. The head of claim 5, wherein both of said cap reducer and said gate reducer are located above a track for feeding the tape from said spool to said front end of said body.

7. The head of claim 2, wherein said reducer is mounted on an underside of said cap.

8. The head of claim 2, wherein said reducer is wedge-shaped when viewed from a side and is constructed and arranged to reduce the flow of adhesive from the outlet.

9. The head of claim 2, wherein said reducer is provided with spaced notches on an underside defining outlets for the flow of adhesive.

10. The head of claim 2, wherein said reducer extends a width of said cap.

\* \* \* \* \*